Aug. 16, 1966    J. H. OBERMEYER    3,266,337
FOOT OPERATOR ARRANGEMENT
Filed Oct. 18, 1963
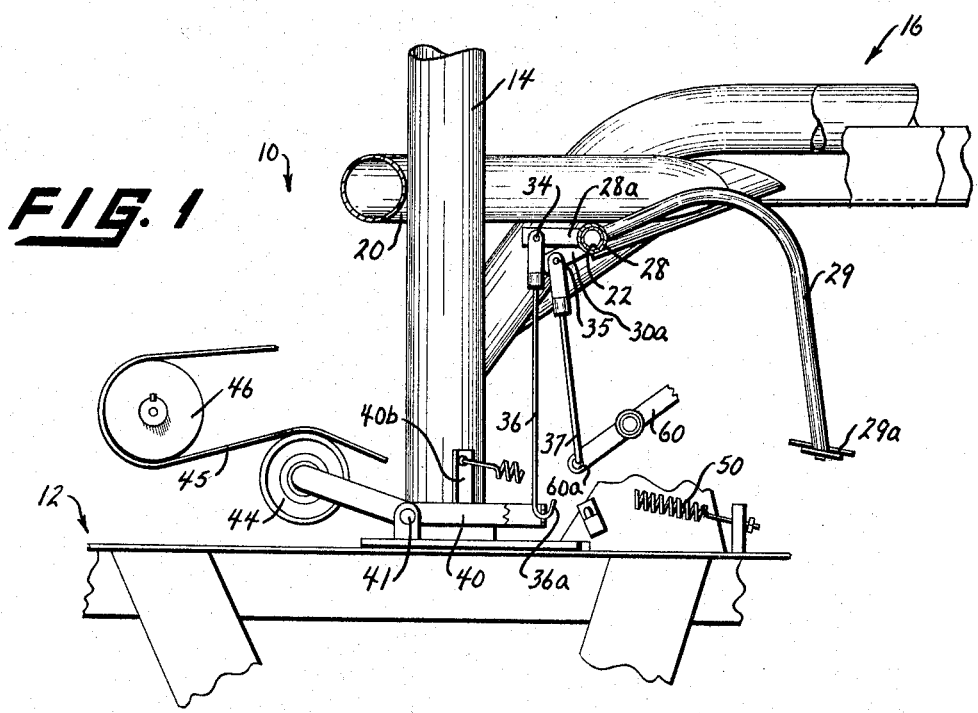
FIG. 1
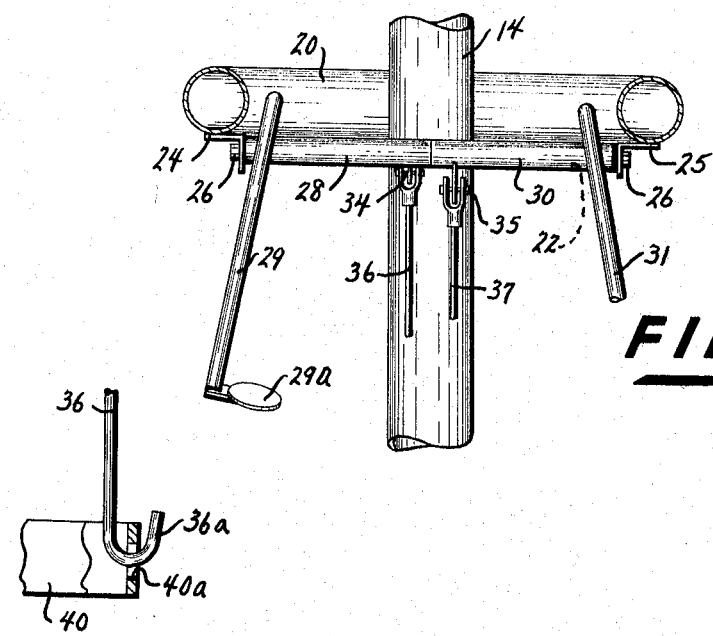
FIG. 2
FIG. 3
INVENTOR.
JAMES H. OBERMEYER
BY
Attorney

United States Patent Office 3,266,337
Patented August 16, 1966

3,266,337
FOOT OPERATOR ARRANGEMENT
James H. Obermeyer, Posey County, Ind., assignor to Hahn, Inc., Evansville, Ind., a corporation of Indiana
Filed Oct. 18, 1963, Ser. No. 317,310
1 Claim. (Cl. 74—512)

The present invention relates to an agricultural vehicle, and more particularly to a new and novel foot pedal and link arrangement therefor.

As is known, the use of high-clearance sprayers has become widespread within the past years, and, in a preferred form thereof, the framework supported by the front wheel, which typically has the power source for the unit mounted thereon, as well as the commonly known foot clutch and brake mechanisms, is rotatable with respect to the remainder of the framework, i.e. that portion which mounts the spraying equipment or the like.

An objectionable feature of these prior arrangements, however, has been that the foot controls or pedals for the clutch and brake mechanisms move along with such rotatable framework, proving awkward and cumbersome to the operator because of the necessity to continually sense where the controls or pedals are positioned.

By virtue of the instant invention, the applicant herein has provided a new and novel foot clutch and brake arrangement for the aforedescribed type of agricultural vehicle, where, briefly, the foot controls for such operating mechanisms are pivotally secured to the stationary framework of the vehicle, notwithstanding that same interconnect with the other operating components disposed on the rotatable framework. Restated otherwise, the instant invention permits the ready pivoting of both the brake and clutch pedals in their same respective planes of movement, notwithstanding that the particular mechanisms controlled by each are mounted on and rotatable with framework which is movable through steering action on the part of the vehicle's operator.

According, the principal object of the present invention is to provide a new and novel brake and clutch arrangement for an agricultural vehicle.

Another object of the present invention is to provide for the new and novel mounting of the foot controls for brake and clutch mechanisms on the stationary framework of an agricultural vehicle, where the controlled mechanisms, i.e. the brake and clutch mechanisms, rotate on and with framework during steering operation.

A further and more general object of the present invention is to provide for the effective new and novel control of clutch and brake mechanisms which are disposed on movable framework of an agricultural vehicle through control members which are disposed on the remaining stationary framework of such vehicle; where such control members provide ease and convenience in use for the vehicle's operator; and, where such instant control is defined by a minimum number of components which successfully combine for the desired end results.

Other objects and a better understanding of the present invention will become more apparent from the following description, taken in conjunction with the accompanying drawing, wherein FIG. 1 is a view in side elevation, partially fragmentary, showing the applicant's new and novel foot clutch and brake arrangement;

FIG. 2 is a view in front elevation, also partly fragmentary, showing further details of the structure of FIG. 1; and FIG. 3 is an enlarged fragmentary view of another detail of the applicant's new and novel invention.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, the applicant's new and novel foot clutch and brake arrangement 10 is disclosed in combination with a conventional high-clearance sprayer defined by a wheel mounted frame 12 having a vertically extending control shaft 14 forming a part thereof. As is known, such framework 12 typically mounts the power source for the apparatus (not shown), as well as conventional clutch and brake mechanisms operatively associated with the latter (only fragmentary details of which are illustrated in FIG. 1).

In that the front wheel of the instant agricultural vehicle typically mounts the framework 12, stationary framework 16 extends therebehind, where such stationary framework 16 assumes various conventional configurations for mounting spraying equipment or the like (not shown). In a typical arrangement, the operator of the high-clearance sprayer is seated on the stationary framework 16 and, through steering mechanism (not shown), rotates the vertical control member 14 and, hence, the framework 12 and the front wheel, for driving in selected paths.

In any event, extending between a tubular member 20 defining a portion of the stationary framework 16 is a shaft 22 positioned, through bolts 26, by brackets 24 and 25, typically secured to the tubular shaft 20 by welding, for example. Rotatably mounted on the shaft 22 are sleeve members 28 and 30, where curved arm members 29 and 31 are respectively secured thereto and extend in the direction of the operator. As should be noticed in FIGS. 1 and 2, a foot receiving pedal 29a is provided at the end of the arm 29, where a similar pedal is disposed at the end of arm 31, although the latter is not shown in the drawing.

Typically, the sleeve member 28 and the arm 29 make up part of the clutch mechanism for the vehicle, while the sleeve 30 and the arm 31 define part of the brake mechanism. In any event, a bracket 28a extends from the sleeve member 28 and, connecting thereto at axle 34, is a downwardly extending shaft or link 36 having an upwardly curved lower end portion 36a. A similar arrangement is involved with sleeve member 30, in that a bracket 30a is secured thereto having, at axle 35, a downwardly extending shaft or link 37 pivotally supported thereby, where such shaft 37 also has an upwardly extending curved end portion.

Although the specific brake and clutch mechanisms are not fully described herein because of their conventional arrangement, the shaft 36, at its upwardly extending lower end portion 36a, hooks into an enlarged opening 40a in pivotal bracket 40, where the latter pivots at axis 41. A roller 44 secured to another portion of bracket 40 selectively engages a belt 45 which operates over a pulley 46. A spring member 50, having one end secured to a portion of the framework 12, and its other end secured to an upstanding element 40b on the bracket 40, serves to maintain the clutch in a normally non-operating condition.

As to the shaft 37, it hooks into an enlarged opening 60a at its curved lower end portion, where the latter, through a system of linkages (not shown) interconnects a conventional braking arrangement.

In use, the pedals for the clutch and brake mechanisms are conveniently accessible to the operator of the agricultural vehicle being, importantly, rotatably mounted, through sleeve members 28 and 30, respectively, on a fixed shaft 22 on the stationary frame 16, so that movement of each is always in the same vertical plane. As the operator rotates the steering mechanism through vertical control member 14, and, hence, the front wheel of the vehicle, the shafts 36 and 37, being in loose hooking engagement in their respective enlarged openings 40a and 60a in the brackets 40 and 60, respectively, permit rotation of the clutch and brake mechanisms, while the pedal or foot control for each, remain, as described, in their single plane position on the stationary frame 16 of the vehicle. In other words, the instant invention has provided an important convenience for the operator of the vehicle in that the foot controls for the clutch and brake mechanisms are always readily available, not turning with the front wheel structure as in prior devices.

Accordingly, and in view of the above, it should be apparent that the applicant herein has provided a considerable improvement for the operation of an agricultural vehicle which typically employs the power source, and the clutch and brake mechanisms thereof, on framework which is rotatable with respect to the remaining framework of the apparatus. The instant invention provides positive operating control for the user, permits complete attention to driving, and does not require the use of hands.

The foot clutch and brake mechanisms control arrangement described hereabove is, of course, susceptible to various changes within the spirit of the invention. For example, other controlled components might be interconnected in the same new and novel manner, and proportioning might differ, as long as controls on the stationary member effect positive control of mechanisms on a movable member. Thus, the preceding description should be considered illustrative, and not as limiting the scope of the following claim.

I claim:
A control mechanism for a mounted-driver agricultural vehicle having a framework defined by a wheel-mounted rotatable front portion and a wheel-mounted rear portion, said rotatable front portion adapted to mount first and second operating mechanisms for a power source thereon, the control mechanism comprising foot controls for said first and second operating mechanisms pivotally mounted on said rear portion and each movable in a single vertical plane irrespective of any movement of said rotatable front portion, a first link depending from and movable with one of said foot controls loosely interconnecting with said first operating mechanism, and a second link depending from and movable with the other of said foot controls loosely interconnecting with said second operating mechanism.

References Cited by the Examiner
UNITED STATES PATENTS

| | | | |
|---|---|---|---|
| 132,261 | 10/1872 | Du Laney | 74—561 X |
| 1,659,685 | 2/1928 | Gerdeman | 180—19 |
| 1,822,714 | 9/1931 | Tatter | 74—478 X |
| 2,279,587 | 4/1942 | Chason | 74—561 |
| 2,292,580 | 8/1942 | Moyer et al. | |
| 2,306,042 | 12/1942 | Custer | 180—26 |
| 2,383,690 | 8/1945 | Sklovsky et al. | 74—560 X |
| 2,453,999 | 11/1948 | Melling | 180—19 |
| 2,582,177 | 1/1952 | Swisher et al. | 180—19 X |
| 2,792,718 | 5/1957 | Ellison | 74—481 X |
| 2,953,036 | 9/1960 | Wendt | 74—484 |
| 2,988,185 | 6/1961 | Pond | 192—11 |

MILTON KAUFMAN, *Primary Examiner.*
BROUGHTON G. DURHAM, *Examiner.*
C. F. GREEN, *Assistant Examiner.*